Feb. 10, 1925.
M. HÖLKEN, SR
1,526,147
PRODUCTION OF FODDER
Filed April 1, 1924
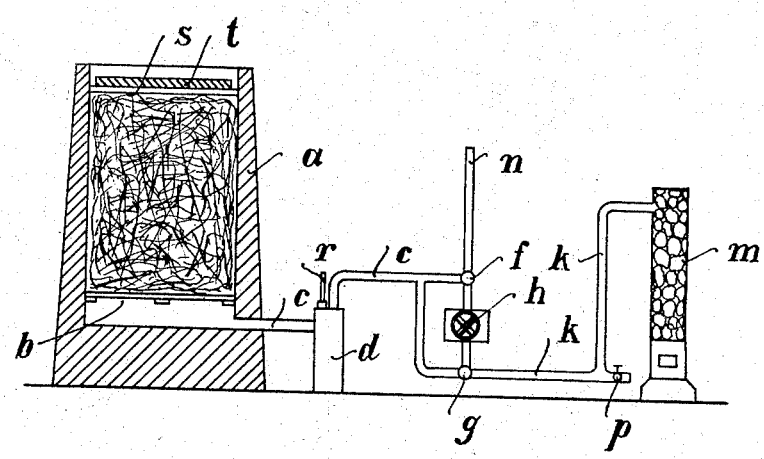
Inventor;
Martin Hölken, Senior
by
Attorney.

Patented Feb. 10, 1925.

1,526,147

UNITED STATES PATENT OFFICE.

MARTIN HÖLKEN, SR., OF BARMEN, GERMANY.

PRODUCTION OF FODDER.

Application filed April 1, 1924. Serial No. 703,513.

*To all whom it may concern:*

Be it known that I, MARTIN HÖLKEN, Sen., a citizen of the German Republic, and residing at Barmen, Rhenish Prussia, Germany, manufacturer, have invented certain new and useful Improvements in the Production of Fodder, for which I have filed application for Letters Patent in Germany on August 14, 1922, and September 22, 1923, and of which the following is a specification.

The present invention refers to a process for rendering green pasture or fodder durable, according to which vegetable matter is converted into sweet pressed fodder by effecting a certain fermentation under pressure. This process enables to be obtained a fodder occupying only little space, and both rich in juice and nourishment, being readily partaken of by animals and influencing milk production in a favourable manner. The drawback of this process is only this, that its successful carrying out depends upon the introduction of a certain fermentation process-stage with development of milk-sugar bacteria, which process-stage is influenced by a number of difficultly observed conditions, in particular by the moisture content of the fodder started with, and therefore readily leads to the undesired formation of acetic acid bacteria, that is, to failure. Especially is it necessary to obtain in the shortest possible time a certain temperature about 50° C. and to exert a sufficiently powerful pressure on the mass of fodder, while a comparatively little increase or decrease in temperature changes the fermentation process and thereby readily spoils the entire mass of fodder.

For quickly obtaining the right degree of heat independently of the existent moisture content of the mass of fodder supplied to the silo, it has already been proposed to effect heating artificially by heating coils mounted in the silo, or by electricity. Both, however, have not been serviceable to the desired extent, because the heat does not penetrate the mass of fodder sufficiently uniformly. Indeed the heat in the immediate vicinity of the coils or electrodes is too intense but at some distance therefrom too little. For example, with electrical heating, the temperature at the walls whereat the electrodes are located may be 90° C. while in the interior of the silo it is only 20° C. Moreover heating by electricity is costly and sometimes not employable.

The object of the present invention is to render green fodder durable by converting it into sweet pressed fodder by the fermentation process in a simple and at the same time reliable manner and independently of the existent moisture content of the fodder supplied.

According to the present invention, this object is attained essentially by this, that the fodder supplied to the silo is heated by directly blowing in warm gases upwardly up to a temperature of 50° C. and is then subjected, in a manner known per se, to powerful pressure. This pressure may conveniently be exerted in this way, that the gases from the fodder adjacent to the covering means of the latter are withdrawn by suction downwardly and the atmospheric air exerts pressure from above on the layer of fodder subjected to suction. Thereby, as experiments have proved, the desired fermentation and sweet pressed fodder are obtained in a simple mannner even under unfavourable conditions.

To carry out the process a silo of usual construction is employed in combination with a coke furnace and air pump, which may operate simultaneously as compressor and is connected by means of a piping system with silo and oven, this connection being such that the discharge gases of the coke furnace are forced by pressure upwardly into the silo with a more or less plentiful admixture of fresh air and can be again exhausted therefrom together with moisture possibly existent.

The accompanying drawing shows diagrammatically such a plant, by way of example.

In this drawing, $a$ is the silo provided in a manner known per se with a grate-like bottom $b$. Below the latter is connected piping $c$ which while passing through a water separator $d$ may be connected as desired with the suction or delivery side of a pump $h$ by means of the two three-way cocks $f$, $g$. To the suction side of the pump is also connected by way of the three-way cock $g$ the delivery pipe $k$ of a coke furnace $m$ while to the three-way cock $f$ on the delivery end of the pump is connected an open pipe $n$.

The mode of the operation is as follows:—

The mass of fodder having been charged in known manner by hand or mechanically into the silo $a$, the warm gases discharged from the coke furnace $m$ are pumped into the bottom of the silo by means of the pump $h$ and in doing this, by suitable adjustment of the valve $p$, so much air is admixed that the temperature of the gaseous mixture passed into the silo is about 50–60° C., as indicated by the thermometer $r$ just before the silo.

By forcing in under pressure this warm mixture of hot gases the fodder is heated in an exceedingly short time with thorough permeation. The temperature within the silo may be observed continually by means of a thermometer therein and the constitution of the mass of fodder in particular its moisture content, may be suitably regulated by the quantity of gaseous mixture supplied, so that in an exceedingly short time the desired heating of the mass to 50–60° C. is brought about.

After the charging and heating of the silo, the fodder is covered with a layer of dry straw or the like. On this is loosely laid a lid $s$, rendered gas-tight by means of a layer of moist loam. Thereupon the pump is run in the reverse direction, so that the gases are exhausted from the silo and the fodder is uniformly compressed by the air pressure acting above, the loam correspondingly sinking. The formation of objectionable voids, which would give rise to decay and mildew in places or to edge putrefaction, may with certainty be avoided so that substantially no loss of fodder need occur. The employment of mechanical presses, with their exceedingly high cost, is no longer necessary but nevertheless an excellent green pressed fodder is obtainable, because by the immediate action of the warm air of about 50° C. all decay and acetic acid producers are exterminated. Only the desired lactose bacteria are capable of forming and serve to produce an excellent green pressed fodder. Repeated blowing in of warm dry air and exhausting the damp air give the desired degree of dryness for good preservation. The preserved green fodder loses only little in nutritive value and is capable of lasting for months.

I claim:—

1. The described method of preserving green fodder in silos by conversion into pressed sweet fodder, which consists in forcing into the green silage heated gases of a temperature to quickly heat and maintain in the silage a temperature of approximately 50 to 60° C.

2. The described method of preserving green fodder in silos by conversion into pressed sweet fodder, which consists in forcing into the green silage coke combustion gases tempered by the admixture of fresh air to a temperature adapted to quickly heat and maintain the silage at a temperature substantially within the limits of 50 to 60° C.

3. The described method of preserving green fodder in silos by conversion into pressed sweet fodder, which consists in forcing into the silage coke combustion gases tempered by fresh air to a temperature to quickly heat the silage to a temperature of not appreciably higher than 60° C. rendering the top of the silage airtight, and withdrawing from the silage the more or less moisture laden gases.

In testimony whereof I affix my signature.

MARTIN HÖLKEN, Sen.